(12) United States Patent
McHale

(10) Patent No.: US 9,603,482 B2
(45) Date of Patent: Mar. 28, 2017

(54) SYSTEMS FOR MAKING SINGLE-CUP BEVERAGES

(71) Applicant: AS IP Holdco, LLC, Piscataway, NJ (US)

(72) Inventor: James McHale, Hillsborough, NJ (US)

(73) Assignee: AS IP Holdco, LLC, Piscataway, NJ (US)

( * ) Notice: Subject to any disclaimer, the term of this patent is extended or adjusted under 35 U.S.C. 154(b) by 157 days.

(21) Appl. No.: 14/321,108

(22) Filed: Jul. 1, 2014

(65) Prior Publication Data
US 2015/0004288 A1 Jan. 1, 2015

Related U.S. Application Data

(60) Provisional application No. 61/841,771, filed on Jul. 1, 2013.

(51) Int. Cl.
*A47J 31/46* (2006.01)
*A47J 31/40* (2006.01)
(Continued)

(52) U.S. Cl.
CPC ........... *A47J 31/465* (2013.01); *A47J 31/407* (2013.01); *B01F 3/08* (2013.01); *B01F 3/12* (2013.01);
(Continued)

(58) Field of Classification Search
CPC ......... A47J 31/465; A47J 31/407; B44D 5/00; B01F 3/08; B01F 3/12; F16K 19/00; F16K 19/03; F16K 19/006
See application file for complete search history.

(56) References Cited

U.S. PATENT DOCUMENTS 2,520,695 A * 8/1950 Sisson ..................... D06F 37/42
318/162
3,702,666 A * 11/1972 Stano .................... G07F 13/065
221/96
(Continued)

FOREIGN PATENT DOCUMENTS

EP 1832826 * 9/2007
GB 2461584 * 1/2010
(Continued)

OTHER PUBLICATIONS

English Translation for KR102005033290 published Apr. 2005.*
(Continued)

*Primary Examiner* — Anthony Weier
(74) *Attorney, Agent, or Firm* — Kramer Levin Naftalis & Frankel LLP

(57) ABSTRACT

Systems and methods are shown for providing hot beverages using a beverage system integrated into a faucet. The faucet-integrated beverage system can include a hot water reservoir mounted under a countertop and fluidly coupled to a cold water supply line. The temperature and fill level in the hot water reservoir can be controlled using control circuitry provided on a circuit board communicatively coupled to the hot water reservoir and one or more sensors. A beverage supply line can extend from the hot water reservoir to a beverage dispensing unit, which can be coupled to the faucet or mounted on the faucet deck. The beverage system can also include an activation button mounted on the faucet or the faucet deck and communicatively coupled to the control board for initiating a brewing process.

10 Claims, 2 Drawing Sheets

(51) Int. Cl.
 *B44D 5/00* (2006.01)
 *B01F 3/08* (2006.01)
 *B01F 3/12* (2006.01)
 *F16K 11/00* (2006.01)

(52) U.S. Cl.
 CPC ............... *B44D 5/00* (2013.01); *F16K 19/00* (2013.01); *F16K 19/006* (2013.01)

(56) References Cited

U.S. PATENT DOCUMENTS

| | | | |
|---|---|---|---|
| 4,328,600 A * | 5/1982 | Bochan | D06F 33/04 68/17 A |
| 4,520,950 A * | 6/1985 | Jeans | B67D 1/0021 137/212 |
| 4,998,850 A * | 3/1991 | Crowell | A47L 15/4427 222/129 |
| 5,225,076 A | 7/1993 | Meredith | |
| 5,293,901 A | 3/1994 | Guzzini | |
| 5,858,437 A | 1/1999 | Anson | |
| 5,899,137 A * | 5/1999 | Miller | A47J 31/005 426/433 |
| 5,901,634 A | 5/1999 | Vancamp | |
| 6,164,189 A | 12/2000 | Anson | |
| 7,163,126 B2 | 1/2007 | Knepler | |
| 7,644,650 B2 * | 1/2010 | Suzuki | A47J 31/005 99/280 |
| 8,225,961 B2 | 7/2012 | Anson | |
| 8,276,787 B1 * | 10/2012 | Gremillion | B67D 1/0004 222/129.1 |
| 2005/0279216 A1 * | 12/2005 | Miller | A47J 41/0016 99/279 |
| 2006/0138246 A1 | 6/2006 | Stowe et al. | |
| 2007/0062972 A1 * | 3/2007 | Feldman | B67D 1/0029 222/129.1 |
| 2007/0152074 A1 | 7/2007 | Stowe et al. | |
| 2014/0069353 A1 * | 3/2014 | Jimenez | A47J 31/005 122/14.31 |

FOREIGN PATENT DOCUMENTS

| | | | |
|---|---|---|---|
| JP | 2003-096849 | | 3/2003 |
| KR | 1020050033290 | * | 4/2005 |
| KR | 100745717 | * | 7/2007 |
| KR | 102009074999 | * | 7/2009 |
| WO | WO2013080073 A1 | | 6/2013 |

OTHER PUBLICATIONS

English Translation for KR 100745717 published Jul. 2007.*
English Translation for KR 102009074999 published Jul. 2009.*
Merrian Webster Dictionary. 2016. http://www.merriam-webster.com/dictionary/faucet.*
International Search Report Application No. PCT/US2014/045050, Date of Mailing Nov. 4, 2014.

* cited by examiner

SYSTEMS FOR MAKING SINGLE-CUP BEVERAGES

CROSS-REFERENCE TO RELATED PROVISIONAL APPLICATION

This application claims the benefit of U.S. Provisional Patent Application No. 61/841,771, filed Jul. 1, 2013, the disclosure of which is incorporated by reference herein in its entirety.

FIELD OF THE INVENTION

The present invention generally relates to systems and methods for making hot single-cup beverages.

BACKGROUND OF THE DISCLOSURE

Systems for making hot beverages are well known in the art. Such systems range from tea kettles, to traditional multi-cup coffee makers, to newer single-cup style hot beverage systems. A major drawback of these traditional systems is that they all require stand-alone equipment that takes up valuable countertop and/or cabinet real estate.

SUMMARY OF THE DISCLOSURE

Generally speaking, faucet-integrated single-cup beverage systems and methods are disclosed that can combine the function of a common faucet with a simple production and delivery system for hot single-cup beverages. The faucet-integrated beverage systems can include a standard mixing valve in fluid communication with hot and cold water supply lines for supplying water of varying temperature in addition to a two-part beverage-dispensing unit. An upper part of the beverage-dispensing unit can be coupled to a faucet or a separate member rising from the faucet deck and can receive a single-cup beverage pod. A lower part of the beverage-dispensing unit can include a hot-water reservoir coupled to a cold water supply via a solenoid valve. Water can be routed from the hot-water reservoir to the upper part of the beverage-dispensing unit to make a hot beverage.

Still other objects and advantages of the present invention will in part be obvious and will in part be apparent from the specification.

The present invention accordingly comprises the several steps and the relation of one or more of such steps with respect to each of the others, and embodies features of construction, combinations of elements, and arrangement of parts adapted to effect such steps, all as exemplified in the detailed disclosure hereinafter set forth, and the scope of the invention will be indicated in the claims.

BRIEF DESCRIPTION OF THE DRAWINGS

For a fuller understanding of the inventive embodiments, reference is made to the following description taken in connection with the accompanying drawings in which.

DETAILED DESCRIPTION OF THE PREFERRED EMBODIMENTS

Figure 1:
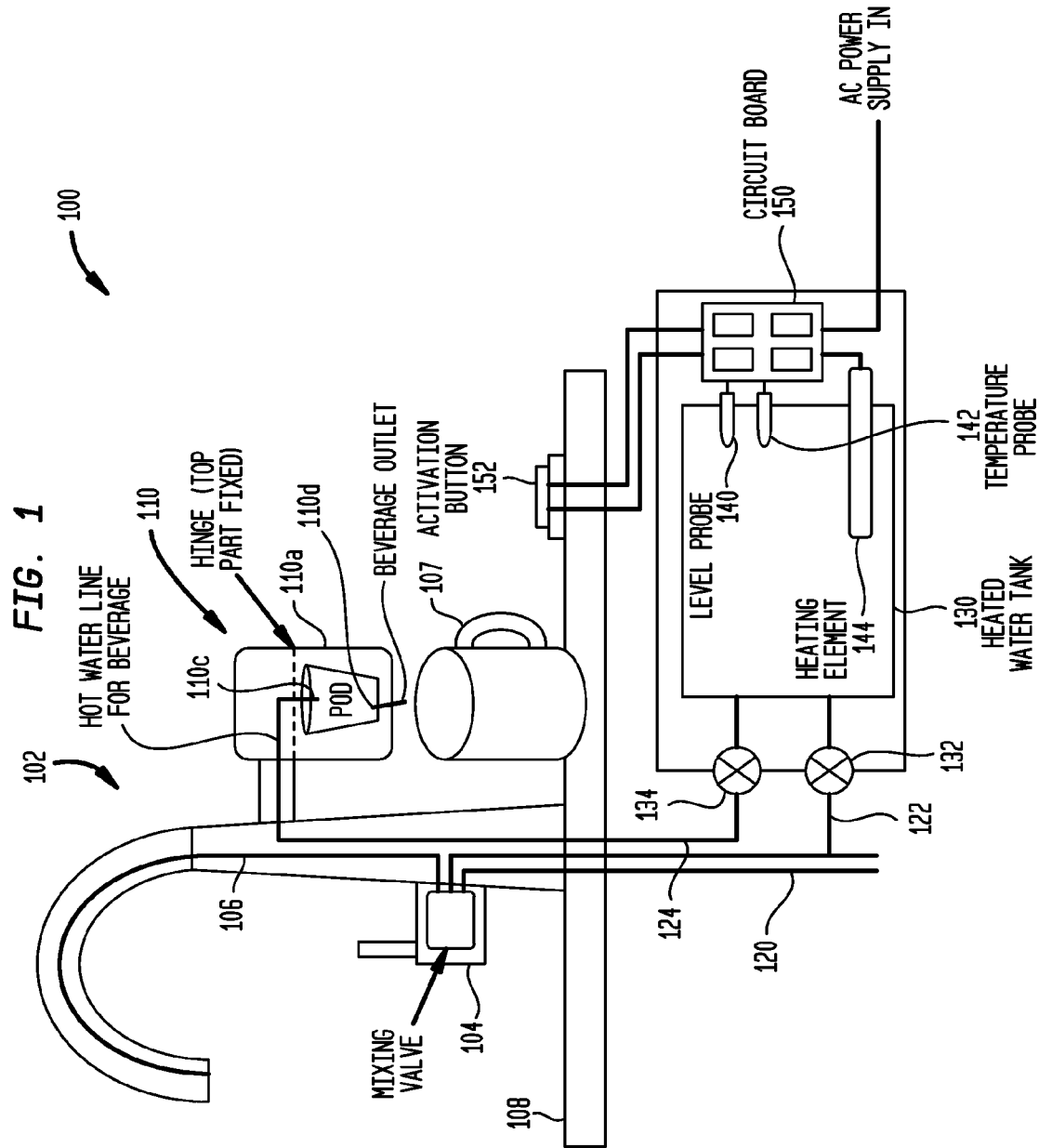
FIG. 1 depicts a schematic diagram of a faucet-integrated single-cup beverage system, in accordance with various embodiments of the invention.

The systems disclosed herein can make and dispense hot single-cup beverages. FIG. 1 shows a schematic diagram of faucet-integrated single-cup beverage system 100, in accordance with various embodiments. Beverage system 100 can include mixing valve 104 in fluid communication with a hot water supply line 120 and a cold water supply line 122 for supplying water of varying temperatures through the tap of a faucet 102 mounted to a countertop 108 via a waterway 106. Beverage system 100 can further include a beverage-dispensing unit 110 capable of receiving a single-cup beverage pod, which can be used to make various hot beverages including coffee, tea, and hot chocolate, for example.

Beverage-dispensing unit 110 may be hinged, allowing a lower part 110a to swing away to accept a beverage pod. Upper part 110b of beverage-dispensing unit 110 can be fixed to the spout of faucet 102. In alternative embodiments, lower part 110a may be fixed to faucet 102 leaving upper part 110b free to swing away to accept the beverage pod. Beverage pods are known in the art and are available from many commercial sources and differ mainly in their physical dimensions. The embodiments disclosed herein should be understood to be compatible with various beverage pods. Accordingly, beverage-dispensing unit 110 may have internal dimensions suitable to accept one or more types of beverage pods.

In some embodiments, beverage-dispensing unit 110 may be a replaceable modular unit. Modularizing beverage-dispensing unit 110 may permit beverage system 100 to accept different types of beverage pods via replacement of a beverage-dispensing unit that is incompatible with a particular type of beverage pod with one that is compatible. Beverage-dispensing unit 110 may, therefore, be coupled to faucet 102 using a removable coupling, such as a threaded coupling, one or more clips, or a press-fit coupling, for example.

Beverage-dispensing unit 110 can include, on its upper end, an entry piercing part 110c for piercing the beverage pod and allowing hot water to flow from hot water reservoir 130 to the pod in beverage-dispensing unit 110. According to some embodiments, the entry piercing part can be a sharpened hollow tube in fluid communication with beverage water supply line 124.

An exit piercing part 110d can be included at the lower end of beverage-dispensing unit 110 for piercing the bottom of the pod to allow the hot beverage to flow into mug 107. When a beverage pod is placed in beverage-dispensing unit 110 and the unit is closed, the beverage pod can be pierced at both ends (top and bottom) such that its interior contents are made available for the brewing process. One or more sensors included within the beverage-dispensing unit 110 can sense the presence of a beverage pod as well as the opening and closing of the beverage-dispensing unit 110.

The clearance from countertop 108 to the bottom of the beverage-dispensing unit 110 can be large enough to accommodate a mug 107. Further, according to some embodiments, the height of beverage-dispensing unit 110 may be adjustable to accommodate mugs of various sizes. For example, the clearance between countertop 108 and beverage-dispensing unit 110 may be at least 7" to accommodate larger travel-sized coffee mugs or adjustable between 3-12" to accommodate a wide range of mug sizes. In order to provide height adjustability, beverage-dispensing unit 110 may be coupled to a track running at least partially along the length of faucet 102.

Beverage system 100 can further include a hot water reservoir 130 that can be mounted underneath countertop 108 on which faucet 102 is installed. As shown in FIG. 1, hot water reservoir 130 can be coupled to cold water supply line 122 through supply solenoid valve 132. A check valve, located on cold water supply line 122, may be provided to prevent water from flowing back into cold water supply line 122. Hot water reservoir 130 may be formed from any suitable material, such as stainless steel, aluminum, a plastic, a composite, or combinations of materials, for example. In some embodiments, hot water reservoir 130 may be insulated to prevent rapid heat loss.

Liquid in hot water reservoir 130 may be heated using heating element 144. Heating element 144 may be located entirely within, partially within, or entirely outside of hot water reservoir 130. Accordingly, heating element 144 may heat liquid in hot water reservoir 130 directly by contacting the liquid using, for example, an electrically resistive immersion heater, or indirectly by heating one or more surfaces of hot water reservoir 130.

Hot water reservoir 130 may be fluidly coupled to beverage-dispensing unit 110 via a beverage water supply line 124. The flow of heated water through beverage water supply line 124 may be controlled using dispenser solenoid valve 134, which may be disposed on beverage water supply line 124 between hot water reservoir 130 and beverage-dispensing unit 110. In some embodiments, dispenser solenoid valve 134 can be located close to hot water reservoir 130 in order to reduce the amount of water that remains in beverage water supply line 124 between uses of beverage system 100. Beverage system 100 can further include a check valve disposed between dispenser solenoid valve 134 and hot water reservoir 130 to prevent back flow of hot water from beverage water supply line 124 into hot water reservoir 130.

Beverage system 100 may include electronic control unit 150, including control circuitry embodied in hardware, firmware, and/or software, for controlling various aspects of the single-cup making processes disclosed herein. In some embodiments, electronic control unit 150 can receive one or more signals indicative of the water level in hot water reservoir 130 from one or more level sensors 140. In response to the water level signals received from level sensors 140, electronic control unit 150 can send one or more control signals to supply solenoid valve 132 causing the valve to open and allowing water to flow into hot water reservoir 130.

Electronic control unit 150 may control this filling process by comparing the water level to various threshold levels. Thus, when the water level is at or below a low threshold, electronic control unit 150 may send one or more signals to open supply solenoid valve 132, permitting water to flow into hot water reservoir 130 until the water level reaches a high threshold level. When the water level reaches the high threshold level, the electronic control unit 150 may send a control signal to supply solenoid valve 132 causing the supply solenoid valve to close.

Electronic control unit 150 may also receive signals indicative of the temperature of liquid inside of hot water reservoir 130 from one or more temperature sensors 142. Temperature sensors 142 may be located at least partially in hot water reservoir 130. In order to control the temperature of liquids inside hot water reservoir 130, electronic control unit 150 may send one or more control signals to heating element 144 causing the heating element to turn on when the temperature is at or below a low threshold. When the temperature of the liquid inside hot water reservoir 130 reaches a high threshold, electronic control unit 150 may send one or more control signal to heating element 144 causing the heating element to turn off.

According to some embodiments, switch 152 can be mounted above countertop 108 and used to initiate a beverage brewing cycle. In other embodiments, however, switch 152 may be mounted on, or otherwise integrated into faucet 102, to make beverage system 100 more compact and avoid the need for additional holes in countertop 108. Upon activation of switch 152, electronic control unit 150 can first verify that beverage system 100 is ready for brewing. This initializing process may involve analyzing signals received from one or more sensors in beverage-dispensing unit 110 to verify that (1) beverage-dispensing unit 110 has been opened since the last brewing cycle, (2) a compatible beverage pod is present in the beverage-dispensing unit 110, and (3) beverage-dispensing unit 110 has been properly closed, for example. Electronic control unit 150 may also consult level sensors 140 and temperature sensors 142 to verify that the water level and temperature are adequate for brewing.

If all conditions are met, electronic control unit 150 can signal solenoid valves 134 and 132 on beverage water supply line 124 and cold water supply line 122, respectively, to open. The cold water entering hot water reservoir 130 can displace some of the heated water from the reservoir and cause it to flow, under pressure, up beverage water supply line 124, into beverage-dispensing unit 110, through entry piercing part 110c, over the contents of the beverage pod (thereby conducting the brewing process), out the exit piercing part 110d, and finally into mug 107 positioned below the beverage dispensing unit.

The addition of cold water to hot water reservoir 130 may result in a temperature drop inside the reservoir. In such cases, electronic control unit 150 can instruct heating element 144 to begin heating the liquid inside of hot water reservoir 130 until the desired temperature conditions are again achieved as measured by temperature sensors 142.

Beverage system 100 may include one or more pressure relief valves to prevent dangerous pressure buildup inside of hot water reservoir 130. In some embodiments, the pressure relief valve may control the pressure prevailing inside hot water reservoir 130 during a refill phase. Accordingly, when supply solenoid valve 132 is open and water is flowing into hot water reservoir 130 from cold water supply line 122, the pressure relief valve may vent hot water reservoir 130 to prevent pressure from building up above a threshold level. At other times, the pressure relief valve may be closed. During the brewing process, for example, maintaining the pressure-relief valve in a closed position may encourage water to flow up beverage water supply line 124 under the pressure prevailing inside hot water reservoir 130.

In further embodiments, the pressure relief valve may also control the pressure prevailing inside hot water reservoir 130 during a rest phase and a brewing phase. During these phases, the pressure relief valve may be configured to vent at a higher pressure level than in the refill phase in order to maintain adequate pressure for encouraging water to flow up beverage water supply line 124 while maintaining pressure at or below a threshold level.

The one or more pressure relief valves may be electrically controllable solenoid valves communicatively coupled to electronic control unit 150. Electronic control unit 150 may send signals to the pressure relief valve to maintain desired pressure inside hot water reservoir 130 as described above. The one or more pressure relief valves may also be embodied as mechanically actuated pressure relief valves configured to open when the pressure inside of hot water reservoir 130 reaches a single threshold level.

In further embodiments, pressure relief valve 146 may also control the pressure prevailing inside hot water reservoir 130 during a rest phase and a brewing phase. During these phases, pressure relief valve 146 may be configured to vent at a higher pressure level than in the refill phase in order to maintain adequate pressure for encouraging water to flow up beverage water supply line 124 while maintaining pressure at or below a threshold level.

The one or more pressure relief valves may be electrically controllable solenoid valves communicatively coupled to electronic control unit 150. Electronic control unit 150 may send signals to pressure relief valve 146 to maintain desired pressure inside hot water reservoir 130 as described above. The one or more pressure relief valves may also be embodied as mechanically actuated pressure relief valves configured to open when the pressure inside of hot water reservoir 130 reaches a single threshold level.

Figure 2:
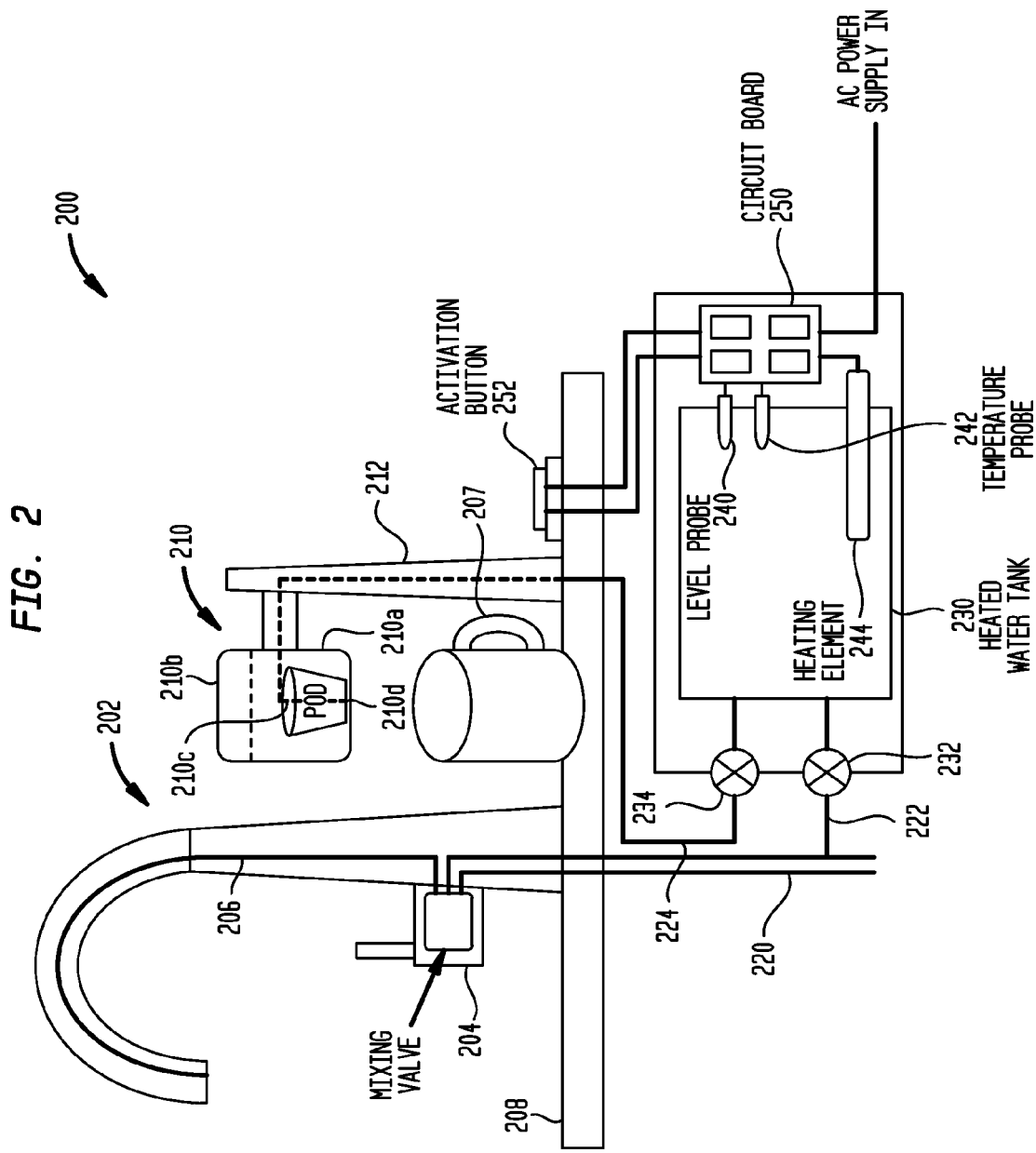
FIG. 2 depicts another schematic diagram of a faucet-integrated single-cup beverage system, in accordance with various embodiments of the invention.

FIG. 2 depicts a schematic diagram of a faucet-integrated single-cup beverage system 200, in accordance with various embodiments. Beverage system 200 can be identical to beverage system 100 of FIG. 1 (with parts 1xx of FIG. 1 relabeled as 2xx) except that beverage-dispensing unit 210 can be affixed to a dispensing member 212 that rises from the faucet deck (e.g., countertop 208 near faucet 202). According to some embodiments, dispensing member 212 can be adjustable (e.g., telescoping) to accommodate mugs 207 of various sizes. In these embodiments, beverage supply line 224 can be routed through dispensing member 212 and into beverage-dispensing unit 210 rather than through faucet 202.

Embodiments of the present invention can be implemented in the form of control logic in software or hardware or a combination of both. For example, particular embodiments can be implemented by using application specific integrated circuits or programmed logic circuits. In general, the functions of particular embodiments can be achieved by any suitable means as is known in the art. Communication or transfer of data or instructions may be wired, wireless, or by any other suitable means. Also, elements of the inventive embodiments can be enabled or disabled as is useful in accordance with a particular application.

Furthermore, it should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

All of the features specified in the description of the figures, in the claims and in the introductory part of the description may be used both individually and also in any desired combination with one another. The invention is therefore not restricted to the described or claimed combinations of features. In fact, all combinations of features should be regarded as being disclosed.

It will be seen that the objects set forth above, among those made apparent from the preceding description, are efficiently attained, and since certain changes may be made without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A faucet-integrated beverage system, comprising:
   a faucet comprising a body and a mixing valve fluidly coupled to a hot water supply line and a first branch of a cold water supply line, the mixing valve also being fluidly coupled to a supply tube passing through the faucet body to a dispensing end;
   a hot water reservoir configured to fluidly couple to a second branch of the cold water supply line and provide heated water; and
   a beverage dispensing unit fluidly coupled to the hot water reservoir via a beverage water supply line, at least a portion of the beverage water supply line passing through the faucet body to deliver heated water from the hot water reservoir to the beverage dispensing unit, the hot water supply line providing heated water to the mixing valve separately from the hot water reservoir.

2. The faucet-integrated beverage system of claim 1, wherein:
   the beverage dispensing unit branches from the body of the faucet.

3. The faucet-integrated beverage system of claim 1, further comprising an electronic control unit configured to control at least one of:
   a water level in the hot water reservoir;
   water temperature in the hot water reservoir; and
   a supply of water to the beverage dispensing unit.

4. The faucet-integrated beverage system of claim 3, further comprising:
   a supply solenoid valve configured to fluidly couple to the second branch of the cold water supply line and communicatively couple to the electronic control unit, the supply solenoid valve being further configured to occupy open and closed positions such that, when the supply solenoid valve is in open position, water is permitted to flow from the cold water supply line into the hot water reservoir, and when the supply solenoid valve is in closed position, water is prevented from flowing from the cold water supply line into the hot water reservoir.

5. The faucet-integrated beverage system of claim 4, further comprising:
   a water level sensor disposed at least partially within the hot water reservoir and configured to communicatively couple to the electronic control unit, wherein:
   the water level sensor is further configured to provide water level signals to the electronic control unit indicative of the water level in the hot water reservoir; and
   the electronic control unit is further configured to control the supply solenoid valve based on the water level signals by:
   causing the supply solenoid valve to occupy open position when the water level in the hot water reservoir is at or below a lower threshold; and
   causing the supply solenoid valve to occupy closed position when the water level is at or above an upper threshold.

6. The faucet-integrated beverage system of claim 5, comprising:
   a dispenser solenoid valve configured to fluidly couple to the beverage supply line and communicatively couple to the electronic control unit, the dispenser solenoid valve being further configured to occupy open and closed positions such that, when the dispenser solenoid valve is in open position, water is permitted to flow from the hot water reservoir to the beverage dispensing unit, and when the dispenser solenoid valve is in closed position, water is prevented from flowing from the hot water reservoir to the beverage dispensing unit.

7. The faucet-integrated beverage system of claim 6, further comprising:

a switch configured to communicatively couple to the electronic control unit, wherein:

activation of the switch causes transmission of an activation signal to the electronic control unit, the activation signal being operative to instruct the electronic control unit to open both the supply solenoid valve and the dispenser solenoid valve; and the electronic control unit is further configured to cause both the supply solenoid valve and the dispenser solenoid valve to occupy open positions such that water is permitted to flow from the hot water reservoir into the beverage dispensing unit.

8. The faucet-integrated beverage system of claim 7, wherein:

the electronic control unit is further configured to cause both the supply solenoid valve and the dispenser solenoid valve to occupy closed positions one of:

after the dispenser solenoid valve has been open for a defined period of time; and after a defined volume of water has passed through the dispenser solenoid valve.

9. The faucet-integrated beverage system of claim 3, further comprising:

a heating element configured to communicatively couple to the electronic control unit and heat water in the hot water reservoir.

10. The faucet-integrated beverage system of claim 9, further comprising:

a temperature probe at least partially disposed in the hot water reservoir and configured to communicatively couple to the electronic control unit, wherein:

the temperature probe provides temperature signals to the electronic control unit indicative of the water temperature in the hot water reservoir; and the electronic control unit controls the heating element based on the temperature signals by:

causing the heating element to turn on when the water temperature in the hot water reservoir is at or below a lower threshold; and causing the heating element to turn off when the water temperature is at or above an upper threshold.

\* \* \* \* \*

UNITED STATES PATENT AND TRADEMARK OFFICE
CERTIFICATE OF CORRECTION

PATENT NO. : 9,603,482 B2
APPLICATION NO. : 14/321108
DATED : March 28, 2017
INVENTOR(S) : James McHale Page 1 of 1

It is certified that error appears in the above-identified patent and that said Letters Patent is hereby corrected as shown below:

In the Specification

Delete Line 64 of Column 4 to Line 4 of Column 5; and

Delete Lines 5 to 13 of Column 5.

Signed and Sealed this
Thirtieth Day of May, 2017

Michelle K. Lee
*Director of the United States Patent and Trademark Office*